(12) United States Patent
Zhang et al.

(10) Patent No.: US 11,987,206 B2
(45) Date of Patent: *May 21, 2024

(54) SAFETY BELT RETRACTOR AND SAFETY BELT ASSEMBLY

(71) Applicant: YANFENG AUTOMOTIVE SAFETY SYSTEMS CO., LTD, Shanghai (CN)

(72) Inventors: Lijun Zhang, Shanghai (CN); Fei Wang, Shanghai (CN)

(73) Assignee: YANFENG AUTOMOTIVE SAFETY SYSTEMS CO., LTD, Shanghai (CN)

( * ) Notice: Subject to any disclaimer, the term of this patent is extended or adjusted under 35 U.S.C. 154(b) by 553 days.

This patent is subject to a terminal disclaimer.

(21) Appl. No.: 17/275,419

(22) PCT Filed: Aug. 14, 2019

(86) PCT No.: PCT/CN2019/100470
§ 371 (c)(1),
(2) Date: Mar. 11, 2021

(87) PCT Pub. No.: WO2020/052396
PCT Pub. Date: Mar. 19, 2020

(65) Prior Publication Data
US 2022/0048465 A1    Feb. 17, 2022

(30) Foreign Application Priority Data

Sep. 14, 2018 (CN) .......................... 201811070904.6

(51) Int. Cl.
*B60R 22/40* (2006.01)
*B60R 22/347* (2006.01)
*B60R 22/46* (2006.01)

(52) U.S. Cl.
CPC ........ *B60R 22/4671* (2013.01); *B60R 22/347* (2013.01)

(58) Field of Classification Search
CPC ....... B60R 22/34; B60R 22/40; B60R 22/347; B60R 22/4671; B60R 2022/401
See application file for complete search history.

(56) References Cited

U.S. PATENT DOCUMENTS

| 4,765,559 A | 8/1988 | Crisp |
| 5,388,780 A | 2/1995 | Matsuki |

(Continued)

FOREIGN PATENT DOCUMENTS

| CN | 1030383 A | 1/1989 |
| CN | 1333150 A | 1/2002 |

(Continued)

OTHER PUBLICATIONS

PCT International Search Report and Written Opinion for PCT Application No. PCT/CN2019/100470 dated Nov. 15, 2019 (12 pages, with English translation of the PCT Search Report).

(Continued)

*Primary Examiner* — Sang K Kim
(74) *Attorney, Agent, or Firm* — Merchant & Gould P.C.

(57) ABSTRACT

The present invention relates to a safety belt retractor, including a bracket, a spool, a locking device, a vehicle sensing device with an adaptive vehicle sensing function and a vehicle sensing adaptivity suppression device. The vehicle sensing adaptivity suppression device includes a driven part (8) and a suppression part (7) that can be held on the driven part by an adhesive force. The driven part has a sliding track, and the suppression part has a sliding portion which can slide on the sliding track against the adhesive force. The suppression part has a retainer, and a sensing seat has a counter retainer that cooperates with the retainer. A retaining connection isn't formed when the suppression part is in the first end position, and is formed when the suppression part leaves away from the first end position to a predetermined extent. Here, the mechanism for achieving the vehicle (Continued)

sensing adaptivity suppression function is simple in structure and low in cost, and can effectively suppress the adaptivity of the vehicle sensing function. The present invention further relates to a safety belt assembly comprising such a safety belt assembly.

18 Claims, 3 Drawing Sheets

(56) References Cited

U.S. PATENT DOCUMENTS

| | | | |
|---|---|---|---|
| 6,523,771 | B2 | 2/2003 | Sumiyashiki |
| 6,726,141 | B1 | 4/2004 | Ichikawa et al. |
| 11,066,041 | B2 | 7/2021 | Michel et al. |
| 2009/0230227 | A1 | 9/2009 | Yoshioka |
| 2017/0341623 | A1* | 11/2017 | Huh ..................... B60R 22/405 |
| 2018/0236969 | A1* | 8/2018 | Michel .................. B60R 22/405 |

FOREIGN PATENT DOCUMENTS

| | | |
|---|---|---|
| CN | 101472773 A | 7/2009 |
| CN | 109177916 A | 1/2019 |
| CN | 209258068 U | 8/2019 |
| JP | H0840201 A | 2/1996 |
| JP | H08216832 A | 8/1996 |
| JP | H11180252 A | 7/1999 |
| WO | 01/30613 A1 | 5/2001 |
| WO | 2017/220297 A1 | 12/2017 |

OTHER PUBLICATIONS

European Search Report for EP Application No. 19860035.5 dated May 6, 2022 (7 pages).

* cited by examiner

SAFETY BELT RETRACTOR AND SAFETY BELT ASSEMBLY

This application is a National Stage Application of PCT/CN2019/100470, filed 14 Aug. 2019, which claims benefit of Serial No. 201811070904.6, filed 14 Sep. 2018 in China and which applications are incorporated herein by reference. To the extent appropriate, a claim of priority is made to each of the above disclosed applications.

TECHNICAL FIELD

The present invention relates to a safety belt retractor and a safety belt assembly including the same.

BACKGROUND ART

As an effective and reliable passive safety device, a safety belt assembly for a vehicle is a mandatory configuration for the vehicle safety. With the increasing number of vehicles and the increasing demand on the driving experience, occupants have higher and higher requirements on NVH. In a driving process, due to the bumpiness of the road and the vibration of the vehicle body, a safety belt retractor often generates disturbing noise, which affects the occupants' driving experience.

In practice, some safety belt retractors are known, which are provided with a locking device for locking a spool of the safety belt retractor in an emergency situation of a vehicle, such as in a traffic accident, so that the occupant can be better restrained and thus better protected.

In addition, some safety belt retractors are provided with a vehicle sensing device for triggering a locking function of a locking device in an emergency of a vehicle. In practice, various vehicle sensing devices are known, which are especially used to sense the acceleration/deceleration and/or an inclination angle of the vehicle and/or the vibration of the vehicle and/or other parameters that can reflect an emergency operation state of the vehicle. For example, when the acceleration or deceleration of the vehicle reaches or exceeds a predetermined threshold value, the vehicle sensing device can trigger the locking function of the locking device, and thus the spool is locked.

In a normal driving process of a vehicle, movable parts of a vehicle sensing device may frequently collide with other parts, and thus disturbing and undesirable noise is generated to an occupant of the vehicle. At present, in the market, for sensing acceleration/deceleration, a following vehicle sensing device is widely used, which triggers a locking function of a locking device through the movement of a vehicle sensing steel ball in a steel ball seat caused by the acceleration/deceleration of the vehicle and the angle of the vehicle. As to this vehicle sensing device, the normal driving of the vehicle may cause frequent collision between the steel ball seat and the vehicle sensing steel ball, and thus disturbing noise is generated.

In order to reduce or even eliminate the vehicle sensing noise of the vehicle sensing device during the normal driving, a vehicle sensing noise suppression function is known, which can improve the NVH level in the vehicle, while the safety performance of the retractor isn't affected, thus the driving experience of the occupant may be improved.

The publication U.S. Pat. No. 5,507,449A has disclosed a safety belt retractor with a function of suppressing the vehicle sensing noise, in which a clutch and a spring for pre-tightening the clutch relative to a rotating shaft are provided, wherein the spring has a swingable spring swing arm, wherein a vehicle sensing function of a vehicle sensing device can be suppressed when the spring swing arm swings to an operation position, thereby the function of suppressing the vehicle sensing noise may be achieved. When the safety belt retractor is to be locked urgently, extraction of a webbing belt drives a spool of the safety belt retractor to rotate, so that the spring swing arm swings away from the position of suppressing the vehicle sensing device, and thus the vehicle sensing function is restored to achieve the function of locking the spool urgently. In the prior art, the vehicle sensing device has many components, is insufficient in reliability and fatigue resistance, and these components are complex in their manufacturing process and are not easy in their assembling, and their manufacturing and mounting costs are high.

The publications CN207523649U, U.S. Pat. No. 9,884,607B2 and CN207466601U are also relevant prior art.

With the development of vehicle technology, requirements on the vehicle interior space and the vehicle safety performance are increasing. In some vehicles, an angle of the seat back is adjustable. Especially when the angle of the seat back can be adjusted in a wide range, it is expected that a vehicle sensing device of a safety belt retractor can be adjusted accordingly, so that a vehicle sensing function of the vehicle sensing device remains in principle unchanged in terms of functionality and sensitivity. To this end, the vehicle sensing device includes an adaptive vehicle sensing assembly that is rotatably supported and is kept oriented by its own gravity, so that a vehicle sensing direction is not changed by the change of the spatial position in the vehicle. When the seat back is adjusted with a large angle or even is laid flat, the normal function of the vehicle sensing device can still be maintained. When the vehicle is in an emergency situation, such as in a collision, the rotation of the adaptive vehicle sensing assembly should be restrained in time, in order to reliably maintain the vehicle sensing function of the vehicle sensing device, that is to say, it is expected to temporarily lock the adaptivity of the vehicle sensing function to maintain the vehicle sensing function. For example, the publications CN207466600U and CN207389143U are relevant prior art.

SUMMARY OF INVENTION

Therefore, it is an object of the present invention to provide a safety belt retractor with an vehicle sensing adaptivity suppression function and a safety belt assembly including the same, wherein the mechanism for achieving the vehicle sensing adaptivity suppression function is simple in structure and low in cost, and can effectively suppress the adaptivity of the vehicle sensing function, if necessary.

For this purpose, the present invention provides a safety belt retractor including a spool, a locking device for locking the spool and a vehicle sensing device for triggering a locking function of the locking device, wherein the vehicle sensing device has an adaptive vehicle sensing function, wherein the safety belt retractor further includes an vehicle sensing adaptivity suppression device for suppressing the adaptivity of the vehicle sensing function of the vehicle sensing device, wherein the vehicle sensing adaptivity suppression device includes a driven part and a suppression part, wherein the driven part can be driven by the spool, and the suppression part can be held on the driven part by an adhesive force, wherein the driven part has a sliding track, and the suppression part has a sliding portion that can slide on the sliding track against the adhesive force, wherein the suppression part has a stop that can cooperate with a stationary counter stop, so that the suppression part can be limited in a first end position, wherein the suppression part has a retainer and the vehicle sensing device has a counter retainer cooperating with the retainer, wherein the retainer and the counter retainer are disengaged when the suppression part is in the first end position, and are engaged when the suppression part leaves away from the first end position to a predetermined extent, so that the adaptivity of the vehicle sensing function is locked.

With the safety belt retractor according to the present invention, when an angle of a seat back is adjusted, an adaptive vehicle sensing assembly can rotate along with the rotation of the seat back, so that the vehicle sensing function does not change unexpectedly due to the angle adjustment of the seat back. In an emergency, the adaptivity of the vehicle sensing function of the vehicle sensing device is locked to prevent the adaptive vehicle sensing assembly from shaking greatly, so that the vehicle sensing function of the vehicle sensing device can function normally and sensitively.

According to an advantageous embodiment of the present invention, the driven part is kinematically coupled with the spool, so that the driven part moves in a first direction when the spool rotates in a winding direction and moves in a second direction opposite to the first direction when the spool rotates in an unwinding direction.

According to an advantageous embodiment of the invention, the kinematical coupling between the driven part and the spool is achieved in such a way that the driven part is coaxially rotation-fixedly connected with the spool, for example the driven part may be sleeved on a shaft head of the spool. Thereby a particularly compact structure may be achieved. Here, the rotation-fixed connection may be permanent and detachable or non-detachable, or may be a connection with a clutch, and thus may be released under a predetermined condition, such as in an emergency of the vehicle.

It is also possible that the driven part is connected with the spool through a transmission. The driven part and the spool may be arranged coaxially or non-coaxially, for example their rotation axes may be arranged at an angle with each other by means of a bevel gear transmission. In addition to transmission of the rotation of the spool into the rotation of the driven part through the transmission, it is also possible to transmit the rotation of the spool into the linear movement of the driven part through the transmission. Therefore, the winding of the spool can cause the driven part to move linearly in the first direction, and the unwinding of the spool can cause the driven part to move linearly in the opposite second direction.

According to the present invention, the suppression part can be held on the driven part by the adhesive force. Particularly advantageously, the adhesive force may be achieved by a static friction force between the suppression part and the driven part. Alternatively or additionally, the adhesive force may also be achieved by a magnetic force between the suppression part and the driven part. For this purpose, for example, the suppression part and the driven part may be made of a permanent magnetic material or contain a component made of a permanent magnetic material. Alternatively or additionally, the adhesive force may also be achieved by a Velcro connection that is commonly used in the textile field.

Since the suppression part can be held on the driven part by the adhesive force, the driven part can move together with the suppression part if the suppression part has not reached the end positions defined by the mutual contact of the retainers associated with each other. When the suppression part reaches the first end position in the first direction, the driven part can continue to move in the first direction, while the suppression part remains in the first end position. When the suppression part is retained in the second direction, the driven part can continue to move in the second direction, while the suppression part remains in the retained position.

According to an advantageous embodiment, the driven part is a member of the locking device, such as a locking trigger ratchet wheel. Therefore, a separate driven part may be spared. According to an advantageous further embodiment, the locking device includes a locking trigger ratchet wheel sleeved on a shaft head of the spool, and the driven part is the locking trigger ratchet wheel.

According to an advantageous embodiment, the locking device includes a locking trigger ratchet wheel sleeved on a shaft head of the spool, as well as a locking claw and a spring element, wherein the locking claw is received in a recess in an end region of the spool, and has a pin received in a kidney-shaped groove of the locking trigger ratchet wheel, and has teeth for cooperating with corresponding teeth of a bracket in which the spool is rotatably supported, wherein the spring element biases the locking claw towards a radially inner end of the kidney-shaped groove, so that the teeth of the locking claw are disengaged from the corresponding teeth of the bracket, wherein the locking claw is forcibly guided when the locking trigger ratchet wheel is locked and the spool rotates in an unwinding direction, so that the teeth of the locking claw are engaged with the corresponding teeth of the bracket, and thus the spool is locked. As far as a locking device is concerned, there are various locking devices in the prior art that may also be applied to the safety belt retractor according to the present invention.

According to an advantageous embodiment, the driven part has a circumferential portion that has an inner circumferential surface, an axial end surface and an outer circumferential surface, wherein the inner circumferential surface may form the sliding track. Alternatively or additionally, it is also possible that the outer circumferential surface or the axial end surface of the circumferential portion forms the sliding track. For example, according to a further embodiment, the inner circumferential surface, the axial end surface and the outer circumferential surface of the circumferential portion together form the sliding track, and the sliding portion is configured as a U-shaped part surrounding the sliding track, wherein two side limbs and one bottom limb of the U-shaped sliding portion respectively contact the inner circumferential surface, the axial end surface and the outer circumferential surface of the circumferential portion.

According to an advantageous embodiment, the circumferential portion has an annular groove, and the suppression part has a hook engaged into the annular groove. According to a further embodiment, the annular groove extends into the circumferential portion axially or radially. Through the engagement between the hook and the annular groove, the mounting and positioning of the suppression part on the driven part may be achieved particularly simply.

According to an advantageous embodiment, the sliding portion of the suppression part forms a spring leaf, and is configured to contact the inner circumferential surface of the circumferential portion as the sliding track, wherein the suppression part has a supporting portion to be supported on the outer circumferential surface of the circumferential portion, so that the sliding portion contacts the sliding track with pretension.

Alternatively, it is also possible that the sliding portion of the suppression part forms a spring leaf, and is configured to contact the outer circumferential surface of the circumferential portion as the sliding track, wherein the suppression part has a supporting portion to be supported on the inner circumferential surface of the circumferential portion, so that the sliding portion contacts the sliding track with pretension.

Alternatively or additionally, it is also possible that the elastic sliding portion is pressed against the sliding track by a separate pressing member.

According to an advantageous embodiment, the stop forms a spring. Therefore, when the stop of the suppression part collides with the associated stationary stop, the noise caused thereby is reduced or even avoided. Alternatively or additionally, the stationary stop may also form a spring, or may be provided with a spring, or may be provided with other buffering means, for example, an elastomer element may be fixedly arranged on the stationary stop.

According to an advantageous embodiment, the sliding portion of the suppression part is a continuous element or includes a plurality of separate elements.

According to an advantageous embodiment, the sliding portion is formed as an elongated elastic sliding piece extending along the sliding track.

According to an advantageous embodiment, the retainer is a retaining claw, and the counter retainer is a toothed part, especially a toothed sector, in the vehicle sensing device. Alternatively, the retainer may be a ring, and the counter retainer may be a protrusion cooperating with the ring. Alternatively, the retainer and the counter retainer may be friction surfaces that cooperate with each other. Alternatively or additionally, the retainer and the counter retainer may be connected by an electromagnetic force.

According to an advantageous embodiment, the vehicle sensing device includes a sensing seat that is rotatably supported and keeps its orientation under the action of gravity.

According to an advantageous embodiment, the vehicle sensing device includes a trigger claw, a sensing claw, a sensing seat, a sensing frame, a counterweight and a sensing ball, wherein the trigger claw is fixed to the sensing claw, and the sensing claw is pivotably supported on the sensing seat through a pin, and the counterweight is fixed to the sensing seat, and the sensing seat is rotatably supported in the stationary sensing frame, and the sensing ball is movably placed between the sensing claw and the sensing seat, and can lift the sensing claw when moving away from its rest position, wherein the trigger claw fixed to the sensing claw can trigger a locking function of the locking device when the sensing claw is lifted by the sensing ball to a predetermined extent. Particularly advantageously, a rotation axis of the sensing seat is parallel to a rotation axis of the spool. It is also particularly advantageous that a center of the toothed sector as the counter retainer coincides with a rotation axis of the sensing seat. In particular, the toothed sector is arranged on a cylindrical surface around the rotation axis of the sensing seat. As far as a vehicle sensing device is concerned, various forms are known in the prior art that may be applied to the safety belt retractor according to the present invention.

According to an advantageous embodiment, the suppression part further has an elastic portion for suppressing the vehicle sensing function of the vehicle sensing device, wherein the elastic portion suppresses the vehicle sensing function when the suppression part is in the first end position, and releases the vehicle sensing function when the suppression part leaves away from the first end position to a predetermined extent. Thereby, the vehicle sensing function and the adaptivity of the vehicle sensing function may be achieved simultaneously in the same one suppression part in a particularly simple manner, and they function in coordination with each other.

According to an advantageous embodiment, the suppression part further has an elastic portion for suppressing the vehicle sensing function of the vehicle sensing device, wherein the elastic portion presses the trigger claw or the sensing claw when the suppression part is in the first end position, and releases the trigger claw or the sensing claw when the suppression part leaves away from the first end position to a predetermined extent. Thereby, the vehicle sensing function and the adaptivity of the vehicle sensing function may be achieved simultaneously in the same one suppression part in a particularly simple manner, and they function in coordination with each other.

According to an advantageous embodiment, the locking device includes a locking trigger ratchet wheel, and the trigger claw can engage with ratchet teeth of the locking trigger ratchet wheel when the sensing claw is lifted to a predetermined extent by the sensing ball, and thus the locking function of the locking device can be triggered.

According to an advantageous embodiment, the suppression part is integrally made of a steel sheet, and/or the driven part is integrally made of plastic. It is also possible that the suppression part and/or the driven part are made of any other suitable material, for example, both may be made of steel, or both may be made of plastic by injection molding.

According to an advantageous embodiment, the suppression part is integrally made of a steel sheet, wherein the sliding portion of the suppression part forms a spring leaf and is configured to contact the inner circumferential surface of the circumferential portion of the driven part as the sliding track, wherein the suppression part includes an arm bent from the sliding portion along a longitudinal side of the sliding portion, wherein the arm has a stop at at least one of two ends viewed in a length direction of the sliding portion in a first section adjacent to the sliding portion, and the stop has elasticity by bending, wherein the arm has a hook cut and bent from the arm, and the hook is configured to engage into an annular groove axially extending into the circumferential portion of the driven part, wherein the arm has a supporting portion cut and bent from the arm, and the supporting portion is to be supported on the outer circumferential surface of the circumferential portion of the driven part, wherein the arm has the retainer, and the arm has an elastic portion for suppressing the vehicle sensing function of the vehicle sensing device, wherein the sliding portion is axially positioned on the circumferential portion through the engagement of the hook with the annular groove, and the sliding portion contacts the sliding track with pretension at least through the support of the supporting portion on the outer circumferential surface of the circumferential portion of the driven part.

Here, the suppression part is an integral component integrated with multiple functions, which minimizes the number of parts of the safety belt retractor according to the present invention, and the integral suppression part may be simply and inexpensively manufactured by stamping a metal sheet.

According to an advantageous embodiment, the locking device, the vehicle sensing device and the vehicle sensing adaptivity suppression device are arranged in an axial end region of the spool and are covered by a mechanical side cover that is fastened to a bracket in which the spool is rotatably supported, wherein the locking device is axially positioned by the mechanical side cover, and the vehicle sensing device is mounted to the mechanical side cover, wherein the stationary stop is arranged in the mechanical side cover or in a stationary part of the vehicle sensing device.

According to an advantageous embodiment, a coil spring side cover is provided in the other axial end region of the spool, and a return spring for restoring the spool in a winding direction is mounted to the coil spring side cover.

The present invention further provides a safety belt assembly including a webbing belt and the safety belt retractor according to the present invention, wherein the webbing belt can be wound on the spool of the safety belt retractor.

It should be pointed out here that technical features recited in the specification can be combined arbitrarily, only if combinations are technically feasible or to say not contradictory, and all these combinations are technical contents recited in the specification.

BRIEF DESCRIPTION OF DRAWINGS

Hereinafter, the present invention will be explained in more detail by means of examples with reference to the accompanying drawings, which are used for better understanding of the present invention without limiting the present invention. Schematic drawings are as follows.

EMBODIMENTS

Figure 1:
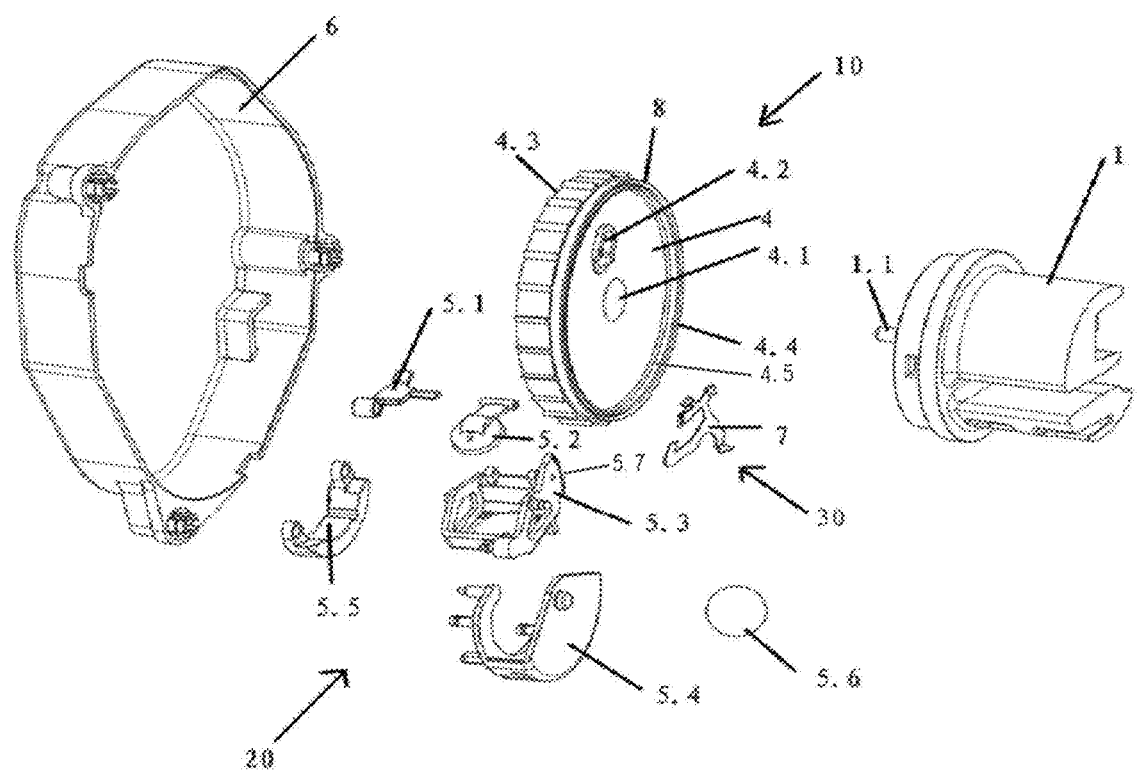
FIG. 1 is an exploded view of a safety belt retractor according to an embodiment of the present invention.

FIG. 1 is an exploded view of a safety belt retractor according to an embodiment of the present invention. The safety belt retractor includes a bracket (not shown), a spool 1 rotatably supported in the bracket, a locking device 10 for locking the spool, a vehicle sensing device 20 for triggering a locking function of the locking device, and an vehicle sensing adaptivity suppression device 30 for suppressing the adaptivity of the vehicle sensing function of the vehicle sensing device.

Hereby, only a portion of the spool 1 is shown, i.e. its left section shown in FIG. 1. A coil spring side cover (not shown) is fixed to the bracket and is arranged in an axial end region on the right side (not shown) of the spool 1 in FIG. 1, and a coil spring (not shown) for restoring the spool 1 in a winding direction is mounted to the coil spring side cover. A webbing belt (not shown) can be wound on the spool 1 in the winding direction, and can be unwound from the spool 1 in an unwinding direction opposite to the winding direction.

In an axial end region of the spool 1 on the left side in FIG. 1, a mechanical side cover 6 is provided, which is also fixed to the bracket, for example fastened to the bracket by screws. The locking device 10, the vehicle sensing device 20, and the vehicle sensing adaptivity suppression device 30 are arranged in the left axial end region of the spool 1, and are covered by the mechanical side cover 6. The locking device 10 is axially positioned by the mechanical side cover 6, and the vehicle sensing device 20 is mounted to the mechanical side cover 6.

The locking device 10 may include a locking pawl, a spring element, and a locking trigger ratchet wheel 4. The locking trigger ratchet wheel 4 is sleeved on a shaft head 1.1 of the spool 1 with its central shaft 4.1. In the left end region of the spool 1, a recess may be made in the spool 1, and the locking claw can be received in the recess. The locking claw may have teeth that can cooperate with corresponding teeth in the bracket. The locking claw may have a pin received in a kidney-shaped groove 4.2 of the locking trigger ratchet wheel 4. The spring element biases the locking claw towards a radially inner end of the kidney-shaped groove 4.2, so that the teeth of the locking claw are disengaged from the corresponding teeth of the bracket. The spring element may be supported with one of its ends on the locking trigger ratchet wheel and with the other end on the pin.

In the case where the locking trigger ratchet wheel 4 isn't locked, it can be driven by the spool 1 to rotate. In an emergency of the vehicle, such as in a traffic accident, the locking trigger ratchet wheel 4 is locked. At this time, the spool 1 continues to rotate in the unwinding direction due to the continuous extraction of the webbing belt, and thus the locking claw is forced to move radially outward in the kidney-shaped groove 4.2 against the spring force of the spring element, until the teeth of the locking claw engage with the corresponding teeth of the bracket, and thus the spool 1 is locked. The locking trigger ratchet wheel 4 has ratchet teeth 4.3 distributed on a circumferential portion thereof. Adjacent to this circumferential portion, another circumferential portion 4.4 is provided, which will be described in detail below.

As shown in FIG. 1, the vehicle sensing device 20 with an adaptive vehicle sensing function includes a trigger claw 5.1, a sensing claw 5.2, a sensing seat 5.3, a sensing frame 5.4, a counterweight 5.5 and a sensing ball 5.6. The trigger claw 5.1 is fixed to the sensing claw 5.2 that is pivotably supported on the sensing seat 5.3 through a pin. The counterweight 5.5 is fixed to the sensing seat 5.3. The sensing seat 5.3 is rotatably supported in the stationary sensing frame 5.4, and the counterweight exerts gravity on the sensing seat, so that the sensing seat keeps its orientation under the action of gravity (mainly the gravity of the counterweight and optionally the gravity of the sensing seat itself) in a free state. The sensing frame 5.4 may be fixedly mounted to the mechanical side cover 6, for example. The sensing ball 5.6 is movably placed between the sensing claw 5.2 and the sensing seat 5.3, and it can lift the sensing claw 5.2 when leaving away from its rest position. When the sensing claw 5.2 is lifted to a predetermined extent by the sensing ball, the trigger claw 5.1 fixed to the sensing claw engages with the ratchet teeth 4.3 of the locking trigger ratchet wheel 4, and thus locks the locking trigger ratchet wheel 4, and thus the locking function of the locking device 10 is triggered as mentioned above. Alternatively, the sensing seat 5.3 may be rotatably supported in the sensing frame 5.4 through a ball hinge. According to another alternative, the sensing seat 5.3 is rotatably supported in the sensing frame 5.4 through a pivot shaft, wherein it is particularly preferable that a rotation axis of the sensing seat is parallel to a rotation axis of the spool 1. The sensing seat 5.3 has teeth, in particular a toothed sector 5.7, configured to cooperate with the retainer 7.4 of the suppression part 7.

When an angle of a seat back is adjusted, the safety belt retractor fixedly mounted to the seat back rotates with a corresponding angle, while the sensing seat 5.3 of the safety belt retractor keeps its orientation under the action of gravity, or to say rotates with a corresponding angle in an opposite direction relative to a stationary part of the safety belt retractor, so that the vehicle sensing direction is consistent with the gravity direction.

The vehicle sensing adaptivity suppression device 30 includes a driven part 8 and a suppression part 7. In the embodiment shown in FIG. 1, the driven part 8 is achieved by a member of the locking device 10, more specifically by the locking trigger ratchet wheel 4. Therefore, it is possible to spare a separate driven part, and it's only necessary to use the locking trigger ratchet wheel 4 per se which already exists.

The driven part 8 or to say the locking trigger ratchet wheel 4 has a circumferential portion 4.4, which has an inner circumferential surface 4.5 and an outer circumferential surface, wherein the inner circumferential surface 4.5 forms a sliding track. This circumferential portion also has an annular groove axially extending into the circumferential portion for receiving the hook of the suppression part 7.

Figure 2:
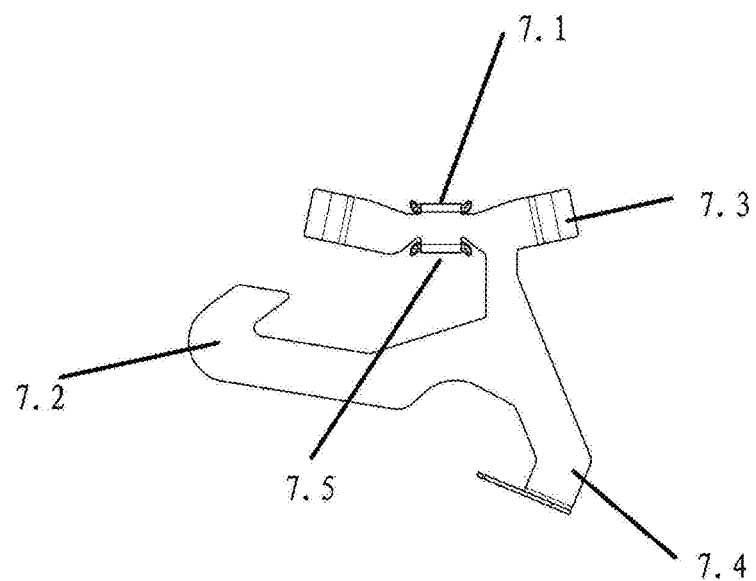
FIG. 2 is a perspective view of a suppression part of the safety belt retractor according to FIG. 1.

As shown in FIG. 2, the suppression part 7 includes a sliding portion 7.1, an elastic portion 7.2 for suppressing the vehicle sensing function, two stops 7.3, a hook, a retainer 7.4 for suppressing the adaptivity of the vehicle sensing function, and a supporting portion 7.5. Here, the elastic portion 7.2 is a particularly advantageous optional means, by which coordinated operation of the vehicle sensing function and the vehicle sensing adaptivity function may be achieved simultaneously through the same one part. The sliding portion 7.1 may form a spring leaf, and the suppression part 7 is axially held on the circumferential portion of the driven part 8 by the engagement of the hook of the suppression part 7 with the annular groove of the driven part 8. The supporting portion 7.5 is supported on the outer circumferential surface of the circumferential portion 4.4. At least through the support of the supporting portion 7.5 on the outer circumferential surface of the circumferential portion, and optionally additionally through the engagement of the hook with the annular groove, the sliding portion 7.1 contacts the sliding track of the driven part 8 with pretension. Through such contact with pretension, a predetermined static friction force exists between the sliding portion 7.1 and the sliding track. FIG. 2 shows an initial relaxed state of the sliding portion 7.1. When the sliding portion 7.1 contacts the cylindrical sliding track, the sliding portion is elastically deformed, and thus a pre-tightening force is generated. One or two of the two stops 7.3 may also form a spring, for example, by bending respective areas of the steel sheet. The sliding portion 7.1 may be configured as a continuous element. Alternatively, it is also possible that the sliding portion 7.1 includes a plurality of separate elements. For example, it is also possible that the hook is cut and bent from the originally continuous sliding portion 7.1, so that the final sliding portion 7.1 includes a plurality of segments that contact the sliding track.

In an alternative (not shown), the hook is firmly constructed so that the radial pretension of the sliding portion 7.1 on the sliding track may be achieved, and the specific supporting portion 7.5 may be spared.

According to a particularly advantageous embodiment, the suppression part 7 is integrally made of a steel sheet. The sliding portion 7.1 forms a spring leaf. An arm is bent from the sliding portion 7.1 along a longitudinal side of the sliding portion 7.1, and two ends of the arm viewed in a length direction of the sliding portion 7.1 in a first section adjacent to the sliding portion 7.1 are bent to form elastic stops 7.3 respectively. In addition, the arm has a hook cut and bent from the arm, and the hook engages into the annular groove axially extending into the circumferential portion of the driven part 8. Through the engagement of the hook with the annular groove, the axial positioning of the suppression part 7 on the circumferential portion 4.4 is achieved.

Here, for example, a supporting portion 7.5 is formed by cutting and bending, and it's to be supported on the outer circumferential surface of the circumferential portion 4.4. The sliding portion 7.1 contacts the sliding track of the driven part 8 with pretension at least mainly through the supporting portion 7.5, wherein the sliding track is formed on the inner circumferential surface of the circumferential portion of the driven part 8.

The arm has a formed elastic portion 7.2 for suppressing the vehicle sensing function in an extension part facing away from the sliding portion 7.1. More specifically, in an effective position of the elastic portion 7.2, it can press the trigger claw 5.1 or the sensing claw 5.2 of the vehicle sensing device 20, and thus in principle completely restrains the movement of the sensing ball 5.6, and thus the collision between the sensing ball 5.6, the sensing seat 5.3 and the sensing claw 5.2 during a normal driving of a vehicle and the resulting vehicle sensing noise may be avoided.

The arm has a formed retainer 7.4 for suppressing the adaptivity of the vehicle sensing function in another extension part extending away from the sliding portion 7.1, and the retainer 7.4 is configured to cooperate with a toothed sector of the sensing seat 5.3 of the vehicle sensing device.

Figure 3:
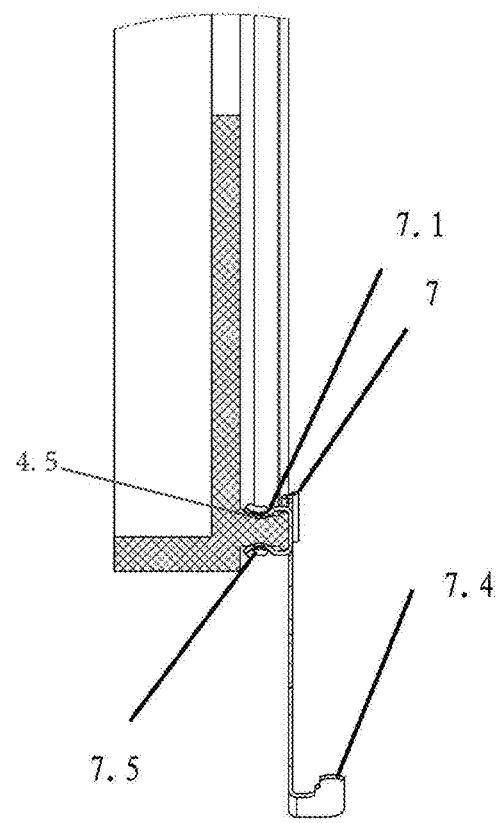
FIG. 3 is a partial longitudinal sectional view of a driven part with the suppression part mounted thereon.

FIG. 3 is a partial longitudinal sectional view of the driven part 8 or to say the locking trigger ratchet wheel 4 with the suppression part 7 mounted thereon. The locking trigger ratchet wheel 4 has ratchet teeth 4.3 distributed on a left circumferential portion in FIG. 3, and the suppression part 7 is mounted on a right circumferential portion in FIG. 3. The sliding portion 7.1 may contact in full area the inner circumferential surface of the right circumferential portion. However, it is also possible that the sliding portion 7.1 may contact the inner circumferential surface of the right circumferential portion in two end regions in a length direction, while leaving a slight distance from the inner circumferential surface in a center region in the length direction.

Figure 4:
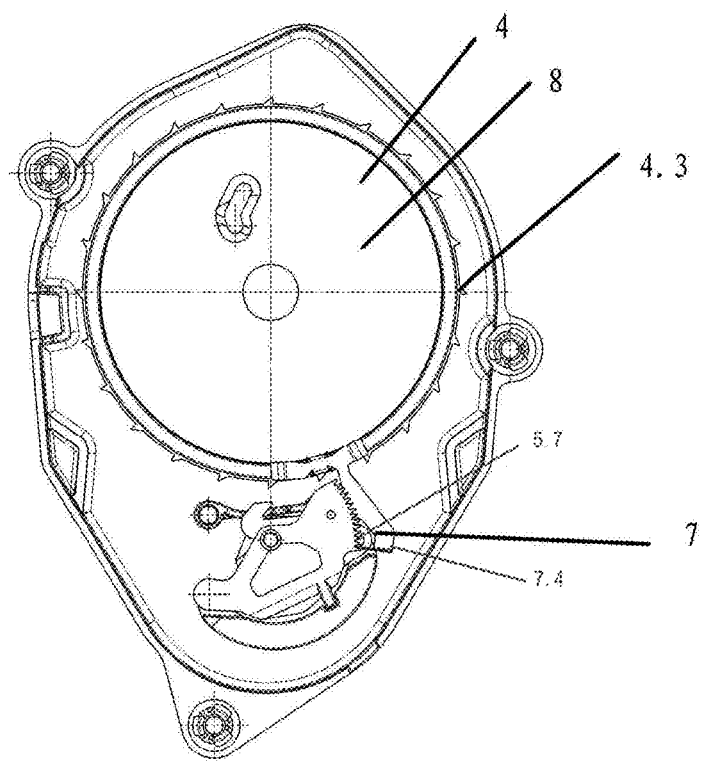
FIG. 4 is a side view of the safety belt retractor in a state where the adaptivity of a vehicle sensing function is locked.
Figure 5:
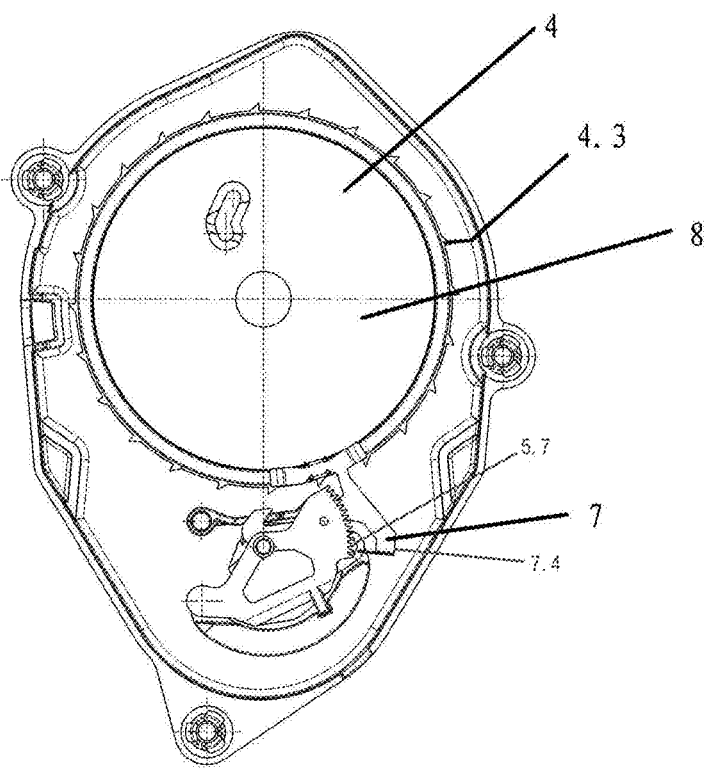
FIG. 5 is a side view of the safety belt retractor in a state where the adaptivity of the vehicle sensing function is active.

FIG. 4 is a side view of the safety belt retractor in a state where the adaptivity of the vehicle sensing function is locked, and FIG. 5 is a side view of the safety belt retractor in a state where the adaptivity of the vehicle sensing function is active. For illustrating an internal structure of the safety belt retractor, the mechanical side cover 6 is omitted in FIGS. 4 and 5 respectively.

When an occupant wears the safety belt, the webbing belt is first extracted with a certain length, and then the webbing belt is wound by the restoring function of the coil spring, until the webbing belt contacts the occupant's body. In the winding process of the webbing belt by the restoring function of the coil spring, the driven part 8 is driven by the spool 1, and the suppression part 7 is driven by the driven part 8, and is limited and maintained in the first end position as shown in FIG. 5. At this time, the retainer 7.4 of the suppression part 7 is disengaged from the toothed sector of the sensing seat 5.3, and the elastic portion 7.2 of the suppression part 7 presses the trigger claw 5.1 or the sensing claw 5.2 of the vehicle sensing device 20, so that the adaptivity of the vehicle sensing function of the vehicle sensing device 20 is active and the vehicle sensing function of the vehicle sensing device 20 is suppressed. In a normal driving of the vehicle, the suppression part 7 may be substantially kept in the first end position, or may be reset to the first end position in time after leaving away from the first end position. Therefore, the vehicle noise may be significantly reduced or even eliminated during the normal driving of the vehicle. When the angle of the seat back is adjusted, the vehicle sensing assembly of the vehicle sensing device is adaptively adjusted to ensure that the vehicle sensing function can function normally and sensitively. When the vehicle is in an emergency situation, such as in a vehicle collision, the webbing belt is quickly extracted, the driven part 8 is driven by the spool 1, and the suppression part 7 is driven by the driven part 8, so that the suppression part 7 leaves away from the first end position as shown in FIG. 5 until it is limited to the retainer position as shown in FIG. 4. At this time, the retainer 7.4 of the suppression part 7 engages the toothed sector of the sensing seat 5.3, so that the rotatability of the sensing seat is locked to prevent the sensing seat from shaking greatly. At the same time, the elastic portion 7.2 of the suppression part 7 doesn't act on the trigger claw 5.1 or the sensing claw 5.2 anymore, and the vehicle sensing function of the vehicle sensing device 20 is restored. The vehicle sensing device 20 senses the emergency situation of the vehicle in time, wherein the sensing ball 5.6 lifts the sensing claw 5.2, and the trigger claw 5.1 fixed to the sensing claw 5.2 triggers the ratchet wheel 4 to lock, and then the locking claw is forced to engage with the corresponding teeth of the bracket to lock the spool 1.

The invention is explained in more detail by means of specific examples above. Finally, it should be pointed out that the above specific embodiments of the present invention are only used for understanding the present invention, and do not limit the scope of protection of the present invention. For those skilled in the art, modifications may be made on the basis of the above embodiments, and all these modifications do not depart from the protection scope of the present invention.

The invention claimed is:

1. A safety belt retractor including a spool, a locking device for locking the spool and a vehicle sensing device for triggering a locking function of the locking device, wherein the vehicle sensing device has an adaptive vehicle sensing function,
    wherein the safety belt retractor further includes vehicle sensing adaptivity suppression device for suppressing the adaptivity of the vehicle sensing function of the vehicle sensing device, and the vehicle sensing adaptivity suppression device includes a driven part and a suppression part,
    wherein the driven part can be driven by the spool,
    wherein the suppression part can be held on the driven part by an adhesive force, wherein the driven part has a sliding track, and the suppression part has a sliding portion that can slide on the sliding track against the adhesive force,
    wherein the suppression part has a stop that can cooperate with a stationary counter stop, so that the suppression part can be limited in a first end position, and
    wherein the suppression part has a retainer, and the vehicle sensing device has a counter retainer cooperating with the retainer, wherein the retainer and the counter retainer are disengaged when the suppression part is in the first end position, and the retainer and the counter retainer are engaged when the suppression part leaves away from the first end position to a predetermined extent, so that the adaptivity of the vehicle sensing function is locked.

2. The safety belt assembly as recited in claim 1, wherein the driven part is kinematically coupled with the spool, so that the driven part moves in a first direction when the spool rotates in a winding direction and moves in a second direction opposite to the first direction when the spool rotates in an unwinding direction.

3. The safety belt assembly as recited in claim 1, wherein the driven part is a locking trigger ratchet wheel of the locking device.

4. The safety belt assembly as recited in claim 1, wherein the driven part has a circumferential portion which has an inner circumferential surface, an axial end surface and an outer circumferential surface, wherein at least one of the inner circumferential surface, the axial end surface and the outer circumferential surface form the sliding track.

5. The safety belt assembly as recited in claim 4, wherein the circumferential portion has an annular groove, and the suppression part has a hook engaged into the annular groove.

6. The safety belt assembly as recited in claim 5, wherein the annular groove extends into the circumferential portion axially or radially.

7. The safety belt assembly as recited in claim 4, wherein the sliding portion of the suppression part forms a spring leaf, and the sliding portion is configured to contact the inner circumferential surface of the circumferential portion as the sliding track, and
    the suppression part has a supporting portion to be supported on the outer circumferential surface of the circumferential portion so that the sliding portion contacts the sliding track with pretension.

8. The safety belt assembly as recited in claim 1, wherein the sliding portion of the suppression part forms a spring leaf and contacts the sliding track of the driven part with pretension.

9. The safety belt assembly as recited in claim 1, wherein the sliding portion is formed as an elongated elastic sliding piece extending along the sliding track.

10. The safety belt assembly as recited in claim 1, wherein the retainer is a retaining claw, and the counter retainer is a toothed part in the vehicle sensing device.

11. The safety belt assembly as recited in claim 1, wherein the vehicle sensing device includes a sensing seat that is rotatably supported and keeps orientation under the action of gravity,
    wherein the vehicle sensing device includes a trigger claw, a sensing claw, a sensing seat, a sensing frame, a counterweight and a sensing ball,
    wherein the trigger claw is fixed to the sensing claw,
    wherein the sensing claw is pivotably supported on the sensing seat through a pin,
    wherein the counterweight is fixed to the sensing seat,
    wherein the sensing seat is rotatably supported in the stationary sensing frame,
    wherein the sensing ball is movably placed between the sensing claw and the sensing seat,
    wherein the sensing ball can lift the sensing claw when moving away from its rest position, wherein the trigger claw fixed to the sensing claw can trigger the locking function of the locking device when the sensing claw is lifted by the sensing ball to a predetermined extent.

12. The safety belt assembly as recited in claim 11, wherein the suppression part further has an elastic portion for suppressing the vehicle sensing function of the vehicle sensing device, wherein the elastic portion presses the trigger claw or the sensing claw when the suppression part is in the first end position, and releases the trigger claw or the sensing claw when the suppression part leaves away from the first end position to a predetermined extent.

13. The safety belt assembly as recited in claim 11, wherein the locking device includes a locking trigger ratchet wheel, wherein the trigger claw can engage with ratchet teeth of the locking trigger ratchet wheel of the locking device when the sensing claw is lifted by a sensing ball to a predetermined extent, and thus the locking function of the locking device can be triggered.

14. The safety belt assembly as recited in claim 1, wherein the suppression part further has an elastic portion for suppressing the vehicle sensing function of the vehicle sensing device, wherein the elastic portion suppresses the vehicle sensing function when the suppression part is in the first end position, and releases the vehicle sensing function when the suppression part leaves away from the first end position to a predetermined extent.

15. The safety belt assembly as recited in claim 1, wherein the stop forms a spring.

16. The safety belt assembly as recited in claim 1, wherein,
the suppression part is integrally made of a steel sheet,
the sliding portion of the suppression part forms a spring leaf, and is configured to contact the inner circumferential surface of the circumferential portion of the driven part as the sliding track, and
the suppression part includes an arm bent from the sliding portion along a longitudinal side of the sliding portion,
wherein the arm has a stop at least one of two ends viewed in a length direction of the sliding portion in a first section adjacent to the sliding portion, and the stop has elasticity by bending,
wherein the arm has a hook cut and bent from the arm, and the hook is configured to engage into an annular groove axially extending into the circumferential portion of the driven part,
wherein the arm has a supporting portion cut and bent from the arm, and the supporting portion is to be supported on the outer circumferential surface of the circumferential portion of the driven part,
wherein the arm has a retainer, and
wherein the arm has an elastic portion for suppressing the vehicle sensing function of the vehicle sensing device,
wherein the sliding portion is axially positioned on the circumferential portion through the engagement of the hook with the annular groove, and the sliding portion contacts the sliding track with pretension at least through the support of the supporting portion on the outer circumferential surface of the circumferential portion of the driven part.

17. The safety belt assembly as recited in claim 1, wherein,
the locking device, the vehicle sensing device and the vehicle sensing adaptivity suppression device are arranged in an axial end region of the spool and are covered by a mechanical side cover that is fastened to a bracket in which the spool is rotatably supported,
wherein the locking device is axially positioned by the mechanical side cover, and the vehicle sensing device is mounted to the mechanical side cover, and
wherein the stationary stop is arranged in the mechanical side cover or in a stationary part of the vehicle sensing device.

18. A safety belt assembly including a webbing belt and the safety belt retractor as recited in claim 1, wherein the webbing belt can be wound on the spool of the safety belt retractor.

* * * * *